(12) United States Patent
Manabe et al.

(10) Patent No.: US 7,715,217 B2
(45) Date of Patent: May 11, 2010

(54) VOLTAGE CONVERSION DEVICE AND VEHICLE

(75) Inventors: Kota Manabe, Toyota (JP); Masahiro Shige, Kaizuka (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 433 days.

(21) Appl. No.: 11/886,791

(22) PCT Filed: Mar. 30, 2006

(86) PCT No.: PCT/JP2006/307297

§ 371 (c)(1),
(2), (4) Date: Sep. 20, 2007

(87) PCT Pub. No.: WO2006/104268

PCT Pub. Date: Oct. 5, 2006

(65) Prior Publication Data

US 2009/0051346 A1 Feb. 26, 2009

(30) Foreign Application Priority Data

Mar. 31, 2007 (JP) ............................. 2005-102752

(51) Int. Cl.
H02M 3/24 (2006.01)
(52) U.S. Cl. .............................. 363/95; 363/41; 363/58; 363/98
(58) Field of Classification Search ...................... 63/40, 63/41, 58, 95, 98, 37, 120, 131, 132
See application file for complete search history.

(56) References Cited

U.S. PATENT DOCUMENTS

| 5,450,360 | A | * | 9/1995 | Sato .......................... 365/200 |
| 5,668,713 | A | * | 9/1997 | Eguchi et al. ................. 363/95 |
| 5,790,396 | A | * | 8/1998 | Miyazaki et al. .............. 363/96 |
| 5,872,710 | A | | 2/1999 | Kameyama |
| 7,362,069 | B2 | * | 4/2008 | Yamamoto et al. .......... 318/599 |
| 2001/0026460 | A1 | | 10/2001 | Ito et al. |
| 2005/0233192 | A1 | | 10/2005 | Ishikawa et al. |

FOREIGN PATENT DOCUMENTS

| JP | 10-164850 A | 6/1998 |
| JP | 2001-352763 A | 12/2001 |
| JP | 2002-262548 A | 9/2002 |
| JP | 2003-299396 A | 10/2003 |
| JP | 2004-120844 A | 4/2004 |
| WO | WO 2004-055929 A1 | 7/2004 |

\* cited by examiner

Primary Examiner—Bao Q Vu
Assistant Examiner—Nguyen Tran
(74) Attorney, Agent, or Firm—Kenyon & Kenyon LLP (57) ABSTRACT

A DC/DC converter includes a reactor, IGBT devices, a dead time generation unit, and a DC-CPU. The dead time generation unit operates in response to a reference signal for a duty ratio, to output first and second activation signals provided with an inactive period corresponding to a dead time preventing both of the IGBT devices from conducting. The DC-CPU corrects a tentative duty ratio calculated as based on a voltage control value, in accordance with a value of a current flowing through the reactor, to output the reference signal. Preferably the DC-CPU associates the value of the current of the reactor with three states and when the value approaches a value at which a state transitions to a different state, the DC-CPU gradually switches a correction value.

8 Claims, 9 Drawing Sheets

FIG.15

VOLTAGE CONVERSION DEVICE AND VEHICLE

This is a 371 national phase application of PCT/JP2006/307297 filed 30 Mar. 2006, which claims priority of Japanese Patent Application No. 2005-102752 filed 31 Mar. 2005, the contents of which are incorporated herein by reference.

TECHNICAL FIELD

The present invention relates to voltage conversion devices and vehicles and particularly to voltage conversion devices provided between two voltage systems and capable of bidirectionally supplying a current and vehicles equipped therewith.

BACKGROUND ART

Japanese Patent Laying-open No. 2004-120844 discloses a control device for a boost converter used in combination with an inverter. This control device operates in response to a difference between a detected output voltage value and an output voltage control value to control a duty ratio of a converter switching device by feedback by proportional-plus-integral control.

The control device obtains the inverter's output power value by an operation circuit and compares the value with a predetermined value by a comparator to determine a path of a current of the converter and in accordance with a result of the determination outputs from a correction circuit an amount of correcting the duty ratio to minimize or prevent variation of the voltage of the converter.

In recent years, electric automobiles, hybrid automobiles, fuel cell automobiles and other similar automobiles that adopt an alternate current motor as a driving source for propelling the vehicle and mount therein an inverter device driving the alternate current motor, have made their appearances.

Some such vehicles mount therein batteries of two or more different voltages, such as a high voltage battery for driving a motor for propelling the vehicle and a low voltage battery for auxiliary machines.

Furthermore, when an automobile having a fuel cell mounted therein starts operation, the fuel cell outputs a voltage, which varies before a steady output is attained. Accordingly, combining the fuel cell with a secondary battery and connecting them together by a voltage converter for use is being studied to ensure steady driving power.

The fuel cell's output voltage and the secondary battery's output voltage both vary with the vehicle's state. Accordingly, the voltage converter connected therebetween operates to supply a current from the secondary battery to the fuel cell and vice versa in accordance with the power required for the vehicle.

Accordingly there is a demand for a voltage converter that can quickly output required voltage in accordance with the vehicle's acceleration, the road's inclination and the like.

Furthermore Japanese Patent Laying-open No. 2004-120844 discloses determining an amount of correcting a duty ratio in accordance with the power output from the inverter. For a system having a fuel cell connected adjacent to an inverter, however, the inverter's output voltage alone can be insufficient for obtaining a correct, optimum amount of correction.

DISCLOSURE OF THE INVENTION

The present invention contemplates a voltage converter that can facilitate controlling an output voltage, and a vehicle equipped therewith.

In summary, the present invention provides a voltage conversion device including a control unit controlling a voltage converter used in combination with an inverter. The control unit includes: detection means for detecting a current passing through the voltage converter; and correction means operative in response to an output received from the detection means for correcting a duty ratio allowing the voltage converter to have a switching device turned on and off.

Preferably, the voltage converter provides voltage conversion between a first power supply node connected to the inverter and a second power supply node connected to an electric storage device.

Still preferably a fuel cell is also connected to the first power supply node via a rectification element.

Still preferably, the voltage converter sets the voltage of the first power supply node to be higher than that of the second power supply node when the duty ratio is larger.

The present invention in another aspect provides a voltage conversion device including a control unit controlling a voltage converter used in combination with an inverter. The control unit includes: a detection unit detecting a current passing through the voltage converter; and a correction unit operative in response to an output received from the detection means to correct a duty ratio allowing the voltage converter to have a switching device turned on and off.

Preferably, the voltage converter provides voltage conversion between a first power supply node connected to the inverter and a second power supply node connected to an electric storage device.

Still preferably, a fuel cell is also connected to the first power supply node via a rectification element.

Still preferably, the voltage converter sets the voltage of the first power supply node to be higher than that of the second power supply node when the duty ratio is larger.

The present invention in still another aspect provides a voltage converter including: a reactor; a first switching device operative in response to a first activation signal to couple one end of the reactor with a first power supply node; a second switching device operative in response to a second activation signal to couple one end of the reactor with a ground node; a first dead time generation unit operative in response to a reference signal for a duty ratio, to output the first and second activation signals provided with an inactive period corresponding to a dead time preventing both the first and second switching devices from conducting; and a control unit correcting a tentative duty ratio calculated as based on a voltage control value, in accordance with a value of a current flowing through the reactor, to output the reference signal.

Preferably the control unit associates the value of the current of the reactor with three states, and when the value of the current of the reactor approaches a value at which a state transitions, the control unit gradually switches a correction value.

Preferably, the control unit exerts proportional-plus-integral-plus-derivative control based on a deviation between the voltage control value and an output voltage value and corrects an integral term in accordance with the value of the current of the reactor to correct the tentative duty ratio.

Preferably, the voltage converter further includes: a second dead time generation unit operative in response to the reference signal to output a third activation signal and a fourth activation signal activated in synchronization with the second activation signal and the first activation signal, respectively; and a third switching device operative in response to the third activation signal to couple an other end of the reactor with a second power supply node; a fourth switching device operative in response to the fourth activation signal to couple the other end of the reactor with a ground node.

Still preferably, the first power supply node is connected to an inverter for driving a motor and the second power supply node is connected to an electric storage device.

Still preferably, a fuel cell is also connected to the first power supply node via a rectification element.

The present invention in still another aspect provides a vehicle including a voltage conversion device including: a reactor; a first switching device operative in response to a first activation signal to couple one end of the reactor with a first power supply node; a second switching device operative in response to a second activation signal to couple one end of the reactor with a ground node; a first dead time generation unit operative in response to a reference signal for a duty ratio, to output the first and second activation signals provided with an inactive period corresponding to a dead time preventing both the first and second switching devices from conducting; and a control unit correcting a tentative duty ratio calculated as based on a voltage control value, in accordance with a value of a current flowing through the reactor, to output the reference signal.

Preferably, the control unit associates the value of the current of the reactor with three states, and when the value of the current of the reactor approaches a value at which a state transitions, the control unit gradually switches a correction value.

Preferably, the control unit exerts proportional-plus-integral-plus-derivative control based on a deviation between the voltage control value and an output voltage value and corrects an integral term in accordance with the value of the current of the reactor to correct the tentative duty ratio.

Preferably, the voltage converter further includes: a second dead time generation unit operative in response to the reference signal to output a third activation signal and a fourth activation signal activated in synchronization with the second activation signal and the first activation signal, respectively; and a third switching device operative in response to the third activation signal to couple an other end of the reactor with a second power supply node; a fourth switching device operative in response to the fourth activation signal to couple the other end of the reactor with a ground node.

Preferably, the vehicle further includes: a motor driving a wheel; an inverter connected to the first power supply node and driving the motor; and an electric storage device connected to the second power supply node.

Still preferably, the vehicle further includes: a fuel cell; and a rectification element connected between the first power supply node and the fuel cell.

In accordance with the present invention an output voltage improved in precision can be provided and if a reactor's current has a varied state the output voltage can be converged to a target value at an early stage.

BEST MODES FOR CARRYING OUT THE INVENTION

Hereinafter the present invention will more specifically be described in embodiments with reference to the drawings. In the figures, identical or corresponding components are identically denoted and will not be described repeatedly.

General Configuration of Vehicle

Figure 1:
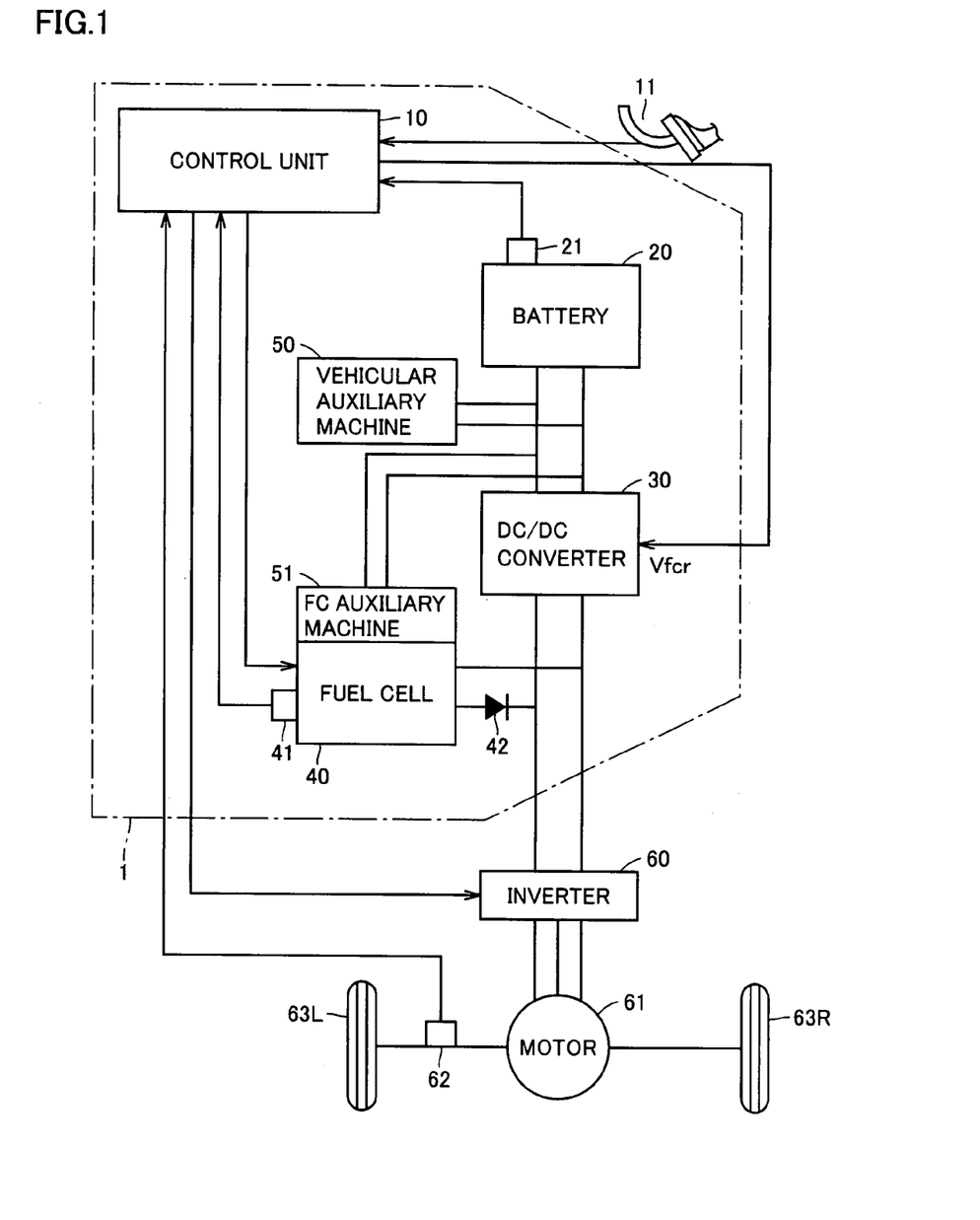
FIG. 1 is a diagram showing a configuration of a vehicle having a voltage converter of an embodiment of the present invention mounted therein.

FIG. 1 is a diagram for illustrating a configuration of a vehicle having a voltage converter of an embodiment of the present invention mounted therein. As one example, the vehicle is shown as a fuel cell automobile. However, the vehicle is not limited thereto. The present invention is also applicable to electric automobiles and hybrid automobiles.

With reference to FIG. 1, the vehicle runs such that a synchronous motor 61 connected to wheels 63L and 63R serves as a source of driving force. Synchronous motor 61 is powered by a power supply system 1. Power supply system 1 outputs a direct current which is in turn converted by an inverter 60 to a three-phase alternate current and thus supplied to synchronous motor 61. Synchronous motor 61 can also function as a power generator in braking.

Power supply system 1 is configured of a fuel cell 40, a battery 20, a DC/DC converter 30, and the like. Fuel cell 40 is a device generating power by an electrochemical reaction of hydrogen and oxygen. As one example, a solid, macromolecular fuel cell can be used. However, fuel cell 40 is not limited thereto. It may be implemented by a phospho-fuel cell, a melted-carbonate fuel cell or a variety of types of fuel cells. When it generates power it utilizes hydrogen gas, which is generated by reforming alcohol or a similar source material. In the present embodiment, a stack serving to generate power, a reformer serving to generate fuel gas, and the like are also included in what is referred to as fuel cell 40. Note that the reformer may be replaced with a configuration utilizing a hydrogen occlusion alloy, a hydrogen cylinder or the like to store hydrogen gas per se.

Battery 20 is a chargeable and dischargeable secondary battery and as one example a nickel metal hydride battery can be used. Furthermore, a variety of types of secondary batteries are applicable. Furthermore, battery 20 may be replaced for example with a chargeable and dischargeable electricity storage other than a secondary battery, such as a capacitor.

Fuel cell 40 and battery 20 are connected to inverter 60 in parallel. A circuit from fuel cell 40 to inverter 60 is provided with a diode 42 to prevent a current flowing from battery 20 or that generated by synchronous motor 61 from flowing back. Appropriately using the power of each of the power supplies connected in parallel entails controlling a relative difference in voltage therebetween. For this purpose, the present embodiment provides DC/DC converter 30 between battery 20 and inverter 60. DC/DC converter 30 is a direct current voltage converter. DC/DC converter 30 functions to receive DC voltage from battery 20, adjust the received DC voltage, and output the adjusted voltage to inverter 60, and functions to receive DC voltage from fuel cell 40 or motor 61, adjust the received DC voltage, and output the adjusted voltage to battery 20. DC/DC converter 30 that thus functions allows battery 20 to be charged and discharged.

Between battery 20 and DC/DC converter 30 a vehicular auxiliary machine 50 and an FC auxiliary machine 51 are connected. In other words, battery 20 serves as a power supply for these auxiliary machines. Vehicular auxiliary machine 50 is a variety of power equipment used in operating the vehicle. It includes illumination appliances, an air conditioner, a hydraulic pump and the like. FC auxiliary machine 51 is a variety of power equipment used in operating fuel cell 40. It includes a pump used for supplying fuel gas, a source material to be reformed and the like, a heater adjusting the reformer in temperature, and the like.

Each component described above is operated as controlled by a control unit 10, which is configured as a microcomputer internally including a CPU, a RAM, and a ROM. Control unit 10 controls inverter 60 to switch to output to synchronous motor 61 a three-phase alternate current corresponding to motive power required. To supply power corresponding to motive power required, it controls the operation of fuel cell 40 and that of DC/DC converter 30.

To implement such control, control unit 10 receives signals from a variety of sensors, which include for example an accelerator pedal sensor 11, a state of charge (SOC) sensor 21 detecting the SOC of battery 20, a flow rate sensor 41 detecting a gas flow rate of fuel cell 40, and a vehicle speed sensor 62 detecting the vehicle's speed. Although not shown, control unit 10 is also connected to other various types of sensors.

Figure 2:
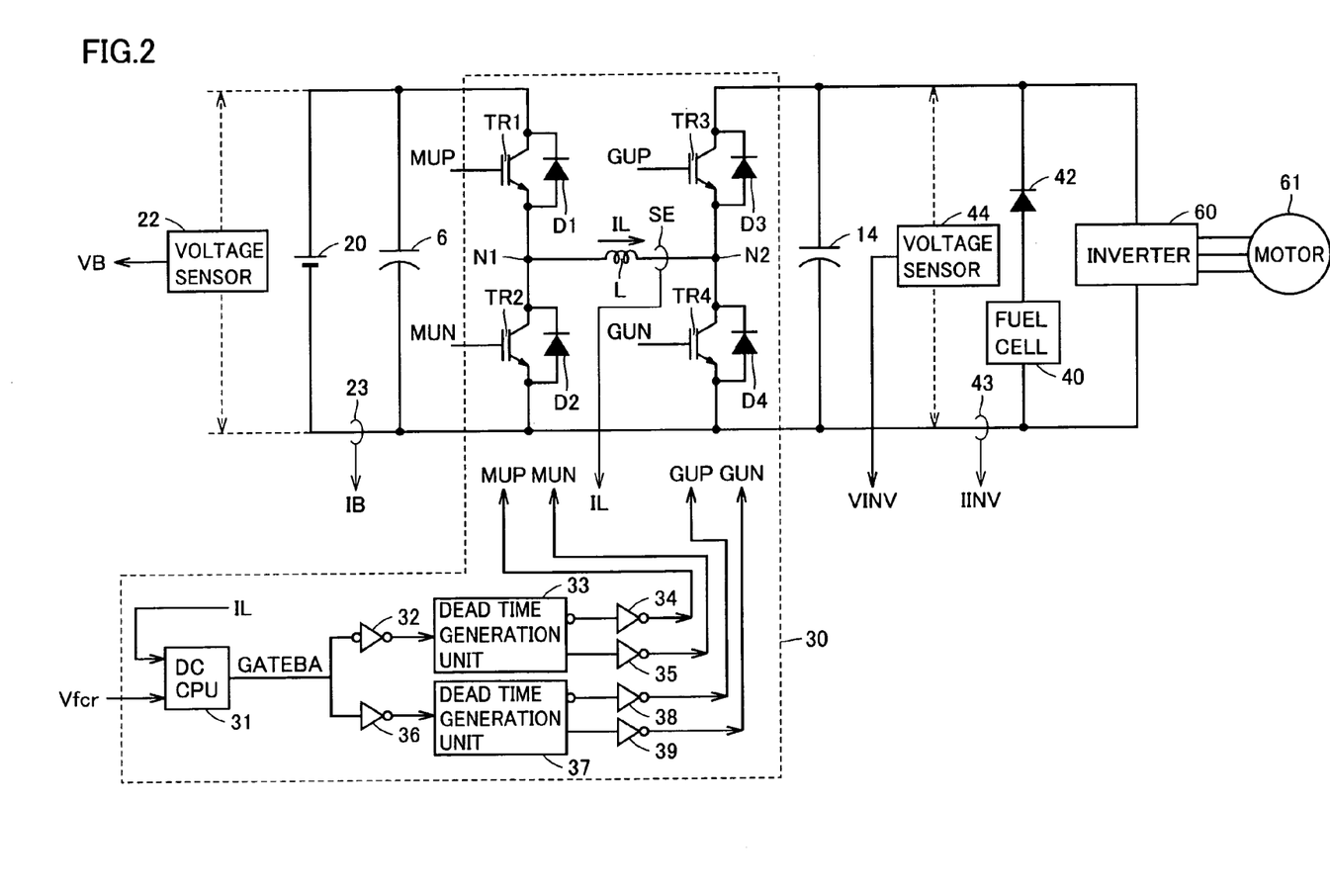
FIG. 2 is a circuit diagram showing a detailed configuration of a DC/DC converter 30 of FIG. 1.

FIG. 2 is a circuit diagram showing a detailed configuration of DC/DC converter 30 of FIG. 1. Note that to help to understand operation, FIG. 2 also shows a configuration of a portion of a portion in a vicinity of DC/DC converter 30.

With reference to FIG. 2, the vehicle is provided with battery 20, a smoothing capacitor 6 connected between terminals of battery 20, inverter 60, motor 61 driven by inverter 60, diode 42 and fuel cell 40 connected in series and supplying a direct current voltage to the inverter, a smoothing capacitor 14 connected between power supply terminals of the inverter. Diode 42 is a protection device for preventing a current from flowing into fuel cell 40.

This vehicle has further mounted therein a voltage sensor 22 detecting a voltage VB of battery 20, a current sensor 23 detecting a current IB flowing to battery 20, a voltage sensor 44 detecting the inverter's voltage VINV, a current sensor 43 detecting a current IINV flowing close to the inverter, and DC/DC converter 30 performing voltage conversion between the battery's voltage VB and the inverter's voltage VINV mutually.

DC/DC converter 30 includes a first arm connected between terminals of battery 20, a second arm connected between power supply terminals of inverter 60, and a reactor L connected between the first and second arms.

The first arm includes IGBT devices TR1 and TR2 connected in series between positive and negative electrodes of battery 20, and a diode D1 connected to IGBT device TR1 in parallel, a diode D2 connected to IGBT device TR2 in parallel.

IGBT device TR1 has a collector connected to the positive electrode of battery 20 and an emitter connected to a node N1. Diode D1 is connected such that a direction from node N1 toward the positive electrode of battery 20 is a forward direction.

IGBT device TR2 has a collector connected to node N1 and an emitter connected to the negative electrode of battery 20. Diode D2 is connected such that a direction from the negative electrode of battery 20 toward node N1 is a forward direction.

The second arm includes IGBT devices TR3 and TR4 connected in series between positive and negative power supply terminals of the inverter, and a diode D3 connected to IGBT device TR3 in parallel, a diode D4 connected to IGBT device TR4 in parallel.

IGBT device TR3 has a collector connected to the positive power supply terminal of inverter 60 and an emitter connected to a node N2. Diode D3 is connected such that a direction from node N2 toward the positive power supply terminal of inverter 60 is a forward direction.

IGBT device TR4 has a collector connected to node N2 and an emitter connected to the negative power supply terminal of inverter 60. Diode D4 is connected such that a direction from the negative power supply terminal of inverter 60 toward node N2 is a forward direction.

Reactor L is connected between nodes N1 and N2.

Voltage VB of battery 20 and the voltage that fuel cell 40 outputs can assume ranges, respectively, which partially overlap. For example, the battery is implemented by a nickel metal hydride battery and its power supply voltage varies within a range for example of 200V to 300V for the sake of illustration. On the other hand, fuel cell 40 outputs a voltage varying within a range for example of 240V to 400V for the sake of illustration. As such, the voltage of battery 20 may be higher or lower than that output from fuel cell 40. Accordingly DC/DC converter 30 is configured to have the first and second arms, as has been described previously. This configuration allows up/down voltage conversion from battery 20 to inverter 60 and up/down voltage conversion from inverter 60 to battery 20.

DC/DC converter 30 further includes a DC-CPU 31, a buffer 32, inversion buffers 34, 35, 36, 38 and 39, dead time generation units 33 and 37, and a current sensor SE detecting a value of a current IL of reactor L.

DC-CPU 31 operates in response to a voltage control value Vfcr and current value IL to output a signal GATEBA serving as a reference for a duty ratio for switching the converter. Signal GATEBA is transmitted by buffer 32 to dead time generation unit 33. Dead time generation unit 33 delays a rise of an output signal to provide two complementary output signals having their respective active periods with a dead time therebetween. For the dead time, the two output signals are both inactivated.

Dead time generation unit 33 outputs the complementary signals, which are in turn input to inversion buffers 34 and 35, respectively. Inversion buffer 34 outputs a gate signal MUP to IGBT device TR1. Inversion buffer 35 outputs a gate signal MDN to IGBT device TR1.

Furthermore, signal GATEBA is also transmitted by inversion buffer 36 to dead time generation unit 37. Dead time generation unit 37 delays a rise or fall of an input signal to provide two complementary output signals having their respective active periods with a dead time therebetween. For the dead time, the two output signals are both inactivated.

Dead time generation unit 37 outputs the complementary signals, which are in turn input to inversion buffers 38 and 39. Inversion buffer 38 outputs a gate signal GUP to IGBT device TR3. Inversion buffer 39 outputs a gate signal GUN to IGBT device TR4.

Figure 3:
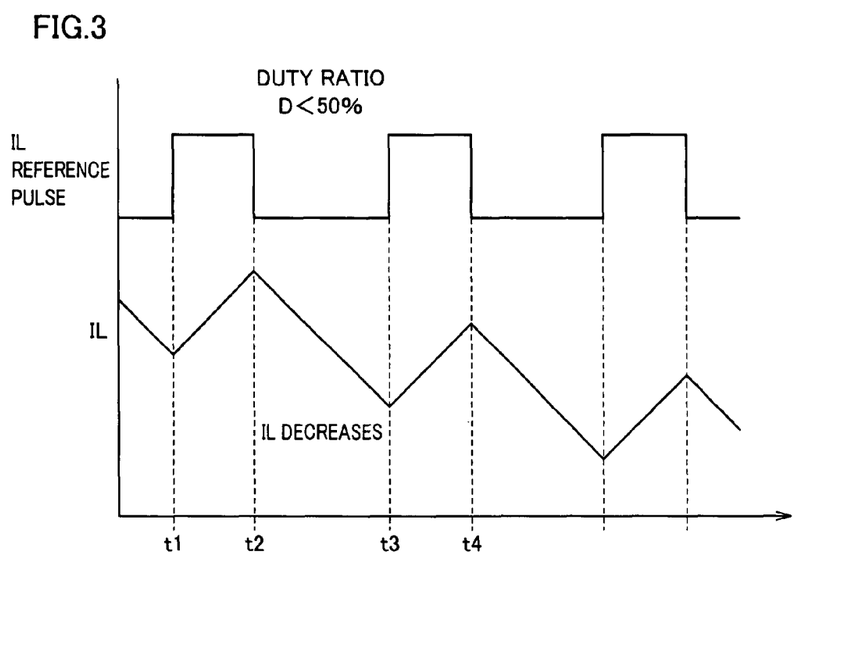
FIG. 3 is a diagram for illustrating how a current passing through a reactor varies when a switching device's duty ratio is smaller than 50%.

FIG. 3 is a diagram for illustrating how a current passing through the reactor varies when a switching device's duty ratio is smaller than 50%.

Figure 4:
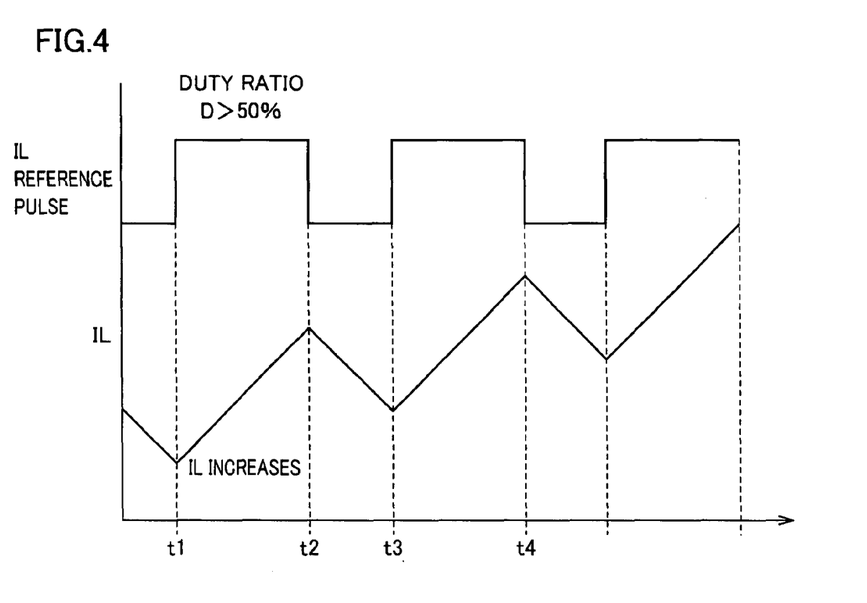
FIG. 4 is a diagram for illustrating how the current passing through the reactor varies when the switching device's duty ratio is larger than 50%.

FIG. 4 is a diagram for illustrating how the current passing through the reactor varies when the switching device's duty ratio is larger than 50%.

Herein the "duty ratio" is represented by Ton/(Ton+Toff), where Ton represents the switching device's on time and Toff represents the switching device's off time.

Furthermore, while the reactor's current has a slope determined by $\Delta I/\Delta T = V/L$, FIGS. 3 and 4 represent the reactor's current IL for a case in which the converter's inlet and outlet are equal in voltage for ease of understanding.

As shown in FIG. 3, when a duty ratio D of an IL reference pulse is smaller than 50%, the reactor's current IL gradually decreases. In contrast, as shown in FIG. 4, when duty ratio D of the IL reference pulse is larger than 50%, the reactor's current IL gradually increases.

When battery 20 of FIG. 2 discharges, IGBT devices TR1 and TR4 are controlled to turn on to store energy to reactor L. Subsequently when IGBT devices TR1 and TR4 are both controlled to turn off, the energy stored in reactor L is discharged through a current path of diode D2→reactor L→diode D3.

This allows power supplied from battery 20 to drive inverter 60 and rotate motor 61. In synchronization therewith, IGBT devices TR2 and TR3 are controlled to conduct to reduce resistance to reduce loss at diodes D2 and D3. It should be noted, however, that when an IGBT device switches to turn off, it turns off with a delay, and accordingly a gate control signal having a dead time is provided.

When reference signal GATEBA generated as DC-CPU 31 of FIG. 2 exerts PWM control is used to generate a signal driving the gate of an IGBT device, a configuration for example delaying an instruction turning on the device is added to avoid a risk of short circuit of the upper and lower arms, and to prevent such short circuit, the upper and lower arms have their IGBT devices both turned off for a period of time, which is referred to as a dead time.

Although not shown, motor 61 is connected to the wheels via a reduction gear. Battery 20 thus discharges when: motor 61 is operated in so high a power range for which fuel cell 40 alone cannot provide power satisfying required power; the vehicle stops, runs with a small load or is driven in a range for which fuel cell 40 is low in efficiency; and the like.

When battery 20 of FIG. 2 is charged, IGBT devices TR2 and TR3 are controlled to turn on to store energy to reactor L. Subsequently when IGBT devices TR2 and TR3 are both controlled to turn off, the energy stored in reactor L is discharged through a current path of diode D4→reactor L→diode D1.

Battery 20 is thus charged when: battery 20 has a reduced SOC and fuel cell 40 also has an output with a margin; or the vehicle that is running is braked and motor 61 provides regenerative operation to recover and store electrical energy to battery 20.

By this operation, the direct current power generated at fuel cell 40 is supplied or the alternate current power generated at motor 61 by regenerative operation is converted at inverter 60 to direct current power and thus supplied to charge battery 20.

The charging of battery 20 is also done with a dead time introduced to prevent the upper and lower arms from short circuit.

Figure 5:
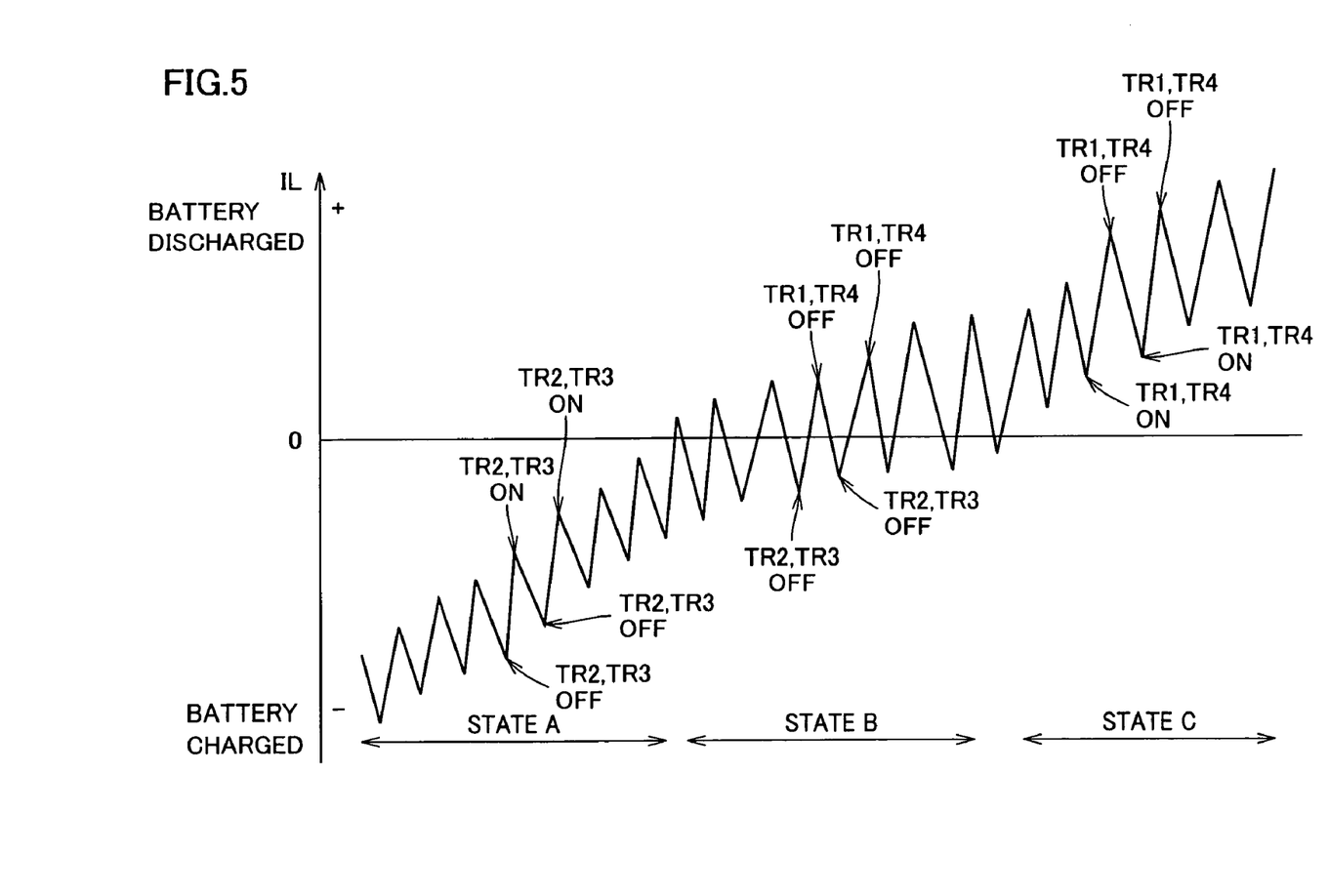
FIG. 5 is a waveform diagram for illustrating that the reactor's current is classified in three states.

FIG. 5 is a waveform diagram for illustrating that the reactor's current is classified in three states.

With reference to FIG. 5, a state A is a state in which the reactor's current IL is constantly negative for one switching cycle. Note that when the reactor has a current in a direction indicated by the arrow of the reactor's current IL shown in FIG. 2, the reactor has the current in a positive direction. In other words, state A is a state in which battery 20 is charged from fuel cell 40 or inverter 60.

A state C is a state in which the reactor's current IL is constantly positive for one switching cycle. In other words, state C is a state in which battery 20 discharges to inverter 60.

A state B is a state in which for one switching cycle the reactor's current IL has a maximum value Imax having a positive value and a minimum value Imin having a negative value. In other words, state B is a state in which a current that charges battery 20 and a current that battery 20 discharges almost antagonizes each other.

Figure 6:
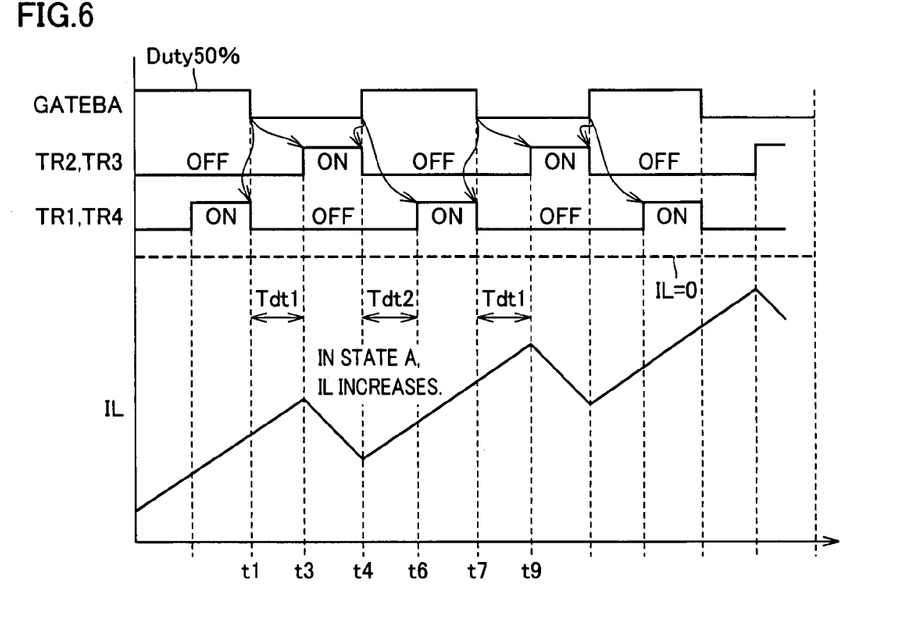
FIG. 6 is an operation waveform diagram representing a relationship between a reference signal GATEBA and a variation of a current of the reactor in a state A shown in FIG. 5.

FIG. 6 is an operation waveform diagram representing a relationship between reference signal GATEBA and a variation of a current of the reactor in state A shown in FIG. 5.

With reference to FIGS. 2 and 6, reference signal GATEBA output from DC-CPU 31 that has a dead time added thereto by dead time generation units 33 and 37 consequently turns on and off IGBT devices TR1-TR4, as shown in the waveform diagram of FIG. 6.

More specifically, at a time t1 reference signal GATEBA falls and in response thereto IGBT devices TR1 and TR4 having been turned on are turned off or inactivated, and when a dead time Tdt1 elapses or a time t3 arrives, IGBT devices TR2 and TR3 having been turned off are turned on or activated.

Subsequently at a time t4 reference signal GATEBA rises and in response thereto IGBT devices TR2 and TR3 having been turned on are turned off or inactivated, and when a dead time Tdt2 elapses or a time t6 arrives, IGBT devices TR1 and TR4 having been turned off are turned on or activated.

Note that IGBT devices TR1-TR4 have diodes D1-D4, respectively, connected thereto in parallel. This allows a current to also flow during a dead time in the forward direction of a diode.

In state A, the reactor's current IL is negative, i.e., flows from the FIG. 2 node N2 to node N1. Accordingly when IGBT devices TR1-TR4 are all turned off, i.e., at a dead time, diodes D1 and D4 conduct.

In other words, for times t6 to t7, for which IGBT devices TR1 and TR4 conduct, plus dead times Tdt1 and Tdt2, i.e., for times t4 to t9, the reactor's current IL increases for one cycle, and the reactor's current IL decreases for one cycle only for times t3 to t4, i.e., when IGBT devices TR2 and TR3 conduct.

As such, if reference signal GATEBA has a duty ratio of 50%, then in state A the reactor's current IL will have a tendency to gradually increase.

Figure 7:
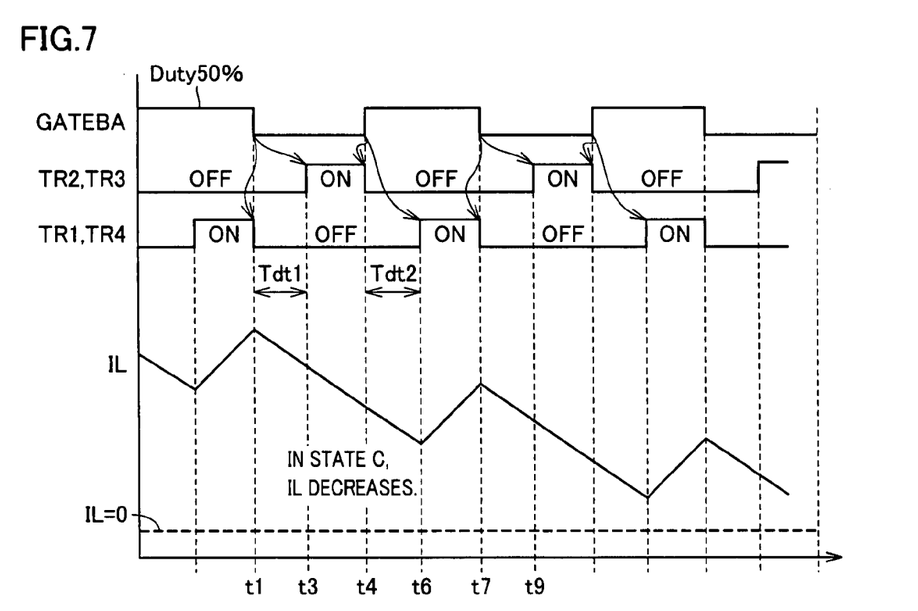
FIG. 7 is an operation waveform diagram representing a relationship between reference signal GATEBA and a variation of a current of the reactor in a state C shown in FIG. 5.

FIG. 7 is an operation waveform diagram representing a relationship between reference signal GATEBA and a variation of a current of the reactor in state C shown in FIG. 5.

Reference signal GATEBA and how IGBT devices TR1-TR4 turn on and off in FIG. 7 are similar those in FIG. 6. Accordingly, they will not be described repeatedly.

With reference to FIGS. 2 and 7, in state C, the reactor's current IL is positive, i.e., flows from the FIG. 2 node N1 to node N2 Accordingly when IGBT devices TR1-TR4 are all turned off, i.e., at a dead time, diodes D2 and D3 conduct.

In other words, for the total time of conductive time of IGBT devices TR2 and TR3 from t3 to t4 and dead times Tdt1 and Tdt2, i.e., for times t1 to t6, the reactor's current IL decreases for one cycle, and the reactor's current IL increases for one cycle only for times t6 to t7, i.e., when IGBT devices TR1 and TR4 conduct.

As such, if reference signal GATEBA has a duty ratio of 50%, then in state C the reactor's current IL will have a tendency to gradually decrease.

Figure 8:
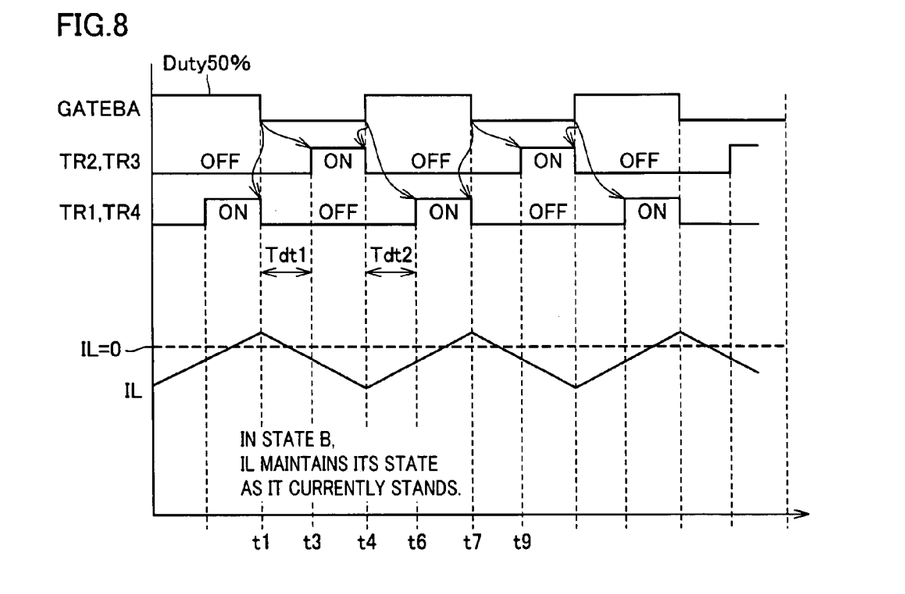
FIG. 8 is an operation waveform diagram representing a relationship between reference signal GATEBA and a variation of a current of the reactor in a state B shown in FIG. 5.

FIG. 8 is an operation waveform diagram representing a relationship between reference signal GATEBA and a variation of a current of the reactor in state B shown in FIG. 5.

Reference signal GATEBA and how IGBT devices TR1-TR4 turn on and off in FIG. 8 are similar those in FIG. 6. Accordingly, they will not be described repeatedly.

With reference to FIGS. 2 and 8, in state B, a period of time for which the reactor's current IL is positive, i.e., flows from the FIG. 2 node N1 to node N2, and a period of time for which the reactor's current IL is negative, i.e., flows from the FIG. 2 node N2 to node N1, are repeated.

In that case, for the total time of conductive time of IGBT devices TR2 and TR3 from t3 to t4, and dead time Tdt1, i.e., for times t1 to t4, the reactor's current IL decreases for one cycle, and for the total time of conductive time of IGBT devices TR1 and TR4 and dead time Tdt2, i.e., for times t4 to t7, the reactor's current IL increases for one cycle.

As such, if reference signal GATEBA has a duty ratio of 50%, and dead times Tdt1 and Tdt2 are equal, then in state B the reactor's current IL will have a tendency to maintain a state that it currently has.

Thus, as has been described with reference to FIGS. 6-8, reference signal GATEBA's duty ratio and a duty by which a current is actually increased/decreased at the reactor differ depending on the state of the current of the reactor.

As such, for precise control, it is necessary to correct the duty ratio of reference signal GATEBA in accordance with the state of the current of the reactor.

More specifically, in state A, it is necessary to correct the duty ratio of reference signal GATEBA to be smaller than a target, and in state C, it is necessary to correct the duty ratio of reference signal GATEBA to be larger than a target.

FIRST EMBODIMENT

Figure 9:
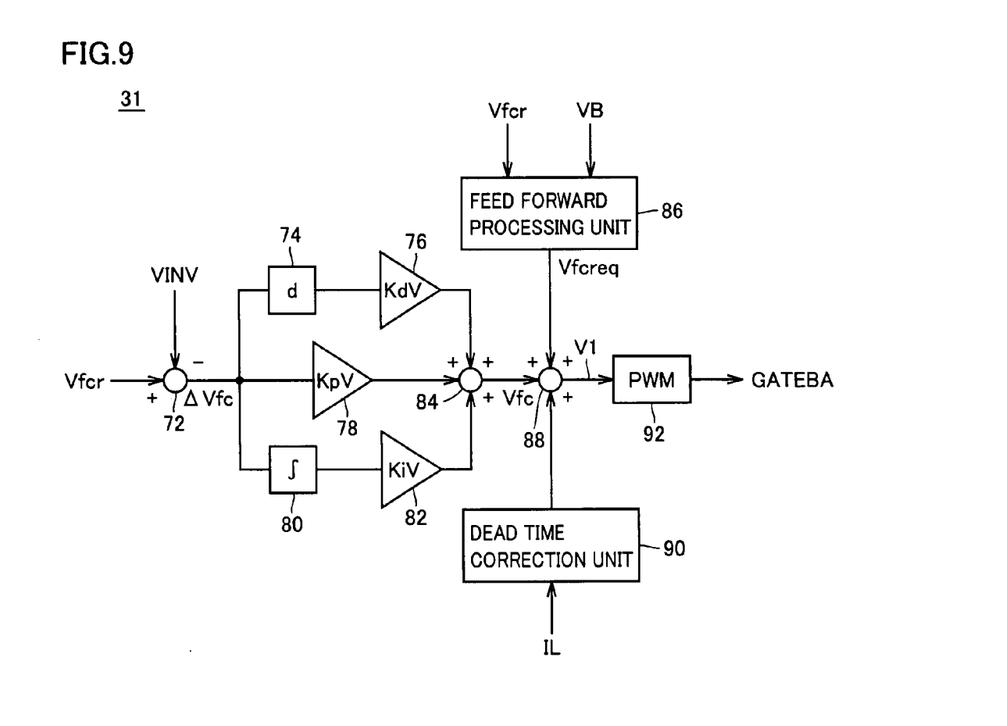
FIG. 9 is a block diagram showing a configuration of DC-CPU 31 shown in FIG. 2.

FIG. 9 is a block diagram showing a configuration of DC-CPU 31 shown in FIG. 2.

With reference to FIG. 9, DC-CPU 31 includes an operation unit 72 calculating a deviation $\Delta Vfc$ between voltage control value Vfcr and the inverter's voltage value VINV, a processing unit 74 differentiating deviation $\Delta Vfc$, an operation unit 76 multiplying an output of processing unit 74 by a derivative term gain KdV, a processing unit 80 integrating deviation $\Delta Vfc$, an operation unit 82 multiplying an output of processing unit 80 by an integral term gain KiV, an operation unit 78 multiplying deviation $\Delta Vfc$ by a mean proportional KpV, and an operation unit 84 calculating a sum of outputs of operation units 76, 82 and 84. Operation unit 84 outputs a sum signal Vfc.

DC-CPU 31 further includes a feed forward processing unit 86 receiving voltage control signal Vfcr and the battery's voltage value VB and calculating and outputting Vfcr/(VB+Vfcr) as a voltage value Vfcreq, a dead time correction unit 90 receiving the reactor's current IL from current sensor SE of FIG. 2, determining which one of states A-C of FIG. 5 it has, and selecting a value correcting the duty ratio by an amount corresponding to a dead time corresponding to the determined state, an addition processing unit 88 adding an output of dead time correction unit 90, voltage value Vfc and voltage value Vfcreq together to output a voltage value V1, and a PWM processing unit 92 receiving voltage value V1 and outputting reference signal GATEBA.

Dead time correction unit 90 performs a process to output e.g., voltage values of –36 V, 5.4 V and 42.8 V for states A, B and C, respectively, as correction values.

PWM processing unit 92 outputs to buffer 32 and inversion buffer 36 of FIG. 2 signal GATEBA indicating a timing that serves as a reference for switching, that corresponds to voltage value V1 provided as a result of the addition provided by addition processing unit 88.

Figure 10:
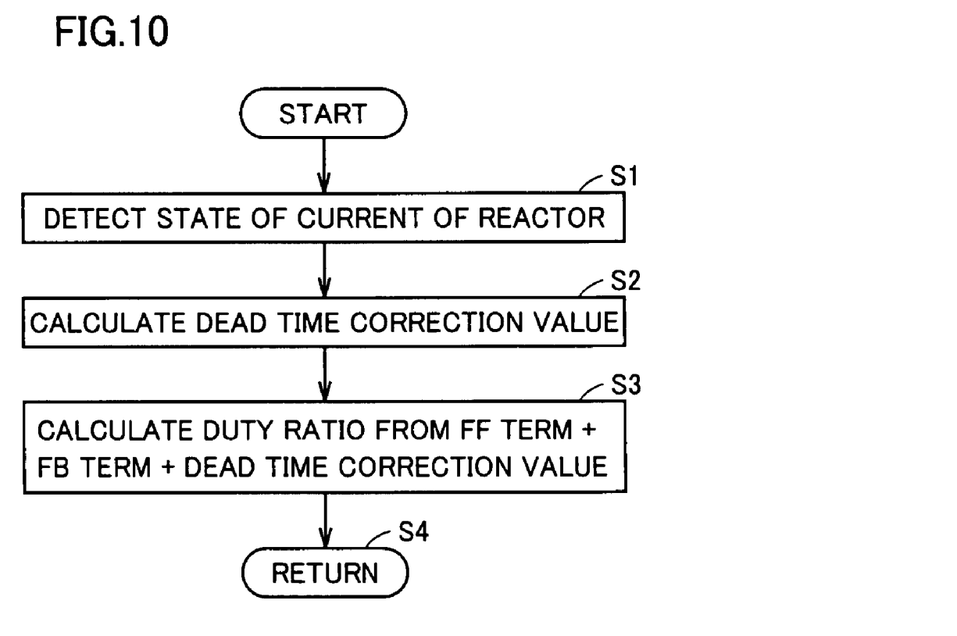
FIG. 10 is flowchart representing a structure of a process performed by DC-CPU 31.

FIG. 10 is flowchart representing a structure of a process performed by DC-CPU 31. This process is invoked for execution from a main routine of the control for each predetermined time or whenever a predetermined condition is established.

With reference to FIG. 10, when the process starts, initially at step S1 DC-CPU 31 obtains the reactor's current value IL output from current sensor SE of FIG. 2 and detects which one of states A-C of FIG. 5 the reactor's current currently has.

More specifically, while current value IL increases/decreases for one cycle, its peak value is observed. If Imax<0, a decision is made that the reactor's current has state A. If Imin>0, a decision is made that the reactor's current has state C. If Imin<0<Imax, a decision is made that the reactor's current has state B.

Then at step S2 a dead time correction value is calculated. For example, for states A, B and C, voltage values of –36 V, 5.4 V and 42.8 V are provided as correction values, respectively, since before input to PWM processing unit 92 of FIG. 9, the duty ratio of reference signal GATEBA is calculated with a voltage value corresponding thereto. If time is used as a reference for representation, and Tdt1=Tdt2=Tdt, then from FIGS. 6, 8 and 7, for states A, B and C, +Tdt, 0 and –Tdt are values, respectively, correcting the duty ratio of reference signal GATEBA, (i.e., dead time correction values). The process then proceeds to step S3.

At step S3 initially a feed forward term (an FF term) and a feed back term (an FB term) are calculated. The FF term is obtained by calculating Vfcr/(VB+Vfcr). The FB term is obtained by performing a PID process to deviation $\Delta Vfc$ between voltage control value Vfcr and the inverter's voltage value VINV. Then the FF term+the FB term+a dead time correction value is calculated to obtain voltage value V1 of FIG. 9 and reference signal GATEBA of a duty ratio corresponding to voltage value V1 is obtained.

When step S3 completes, the control returns to the main routine. By such process, an output voltage improved in precision can be provided, and if the reactor's current has a varied state, the output voltage can be converged to a target value at an early stage.

First Embodiment in Exemplary Variation

In the first embodiment a dead time correction value corresponding to one of three states of a current of a reactor is selected and thus determined. When the reactor's current transitions to vary from a state to a different state, however, there still is a room for improving voltage controllability.

More specifically, if the reactor's current varies from state A then to state B and then to state C, as shown in FIG. 5, switching a dead time correction value abruptly at an instant when state A switches to state B can entail requiring time before a stabilized output voltage is obtained.

Figure 11:
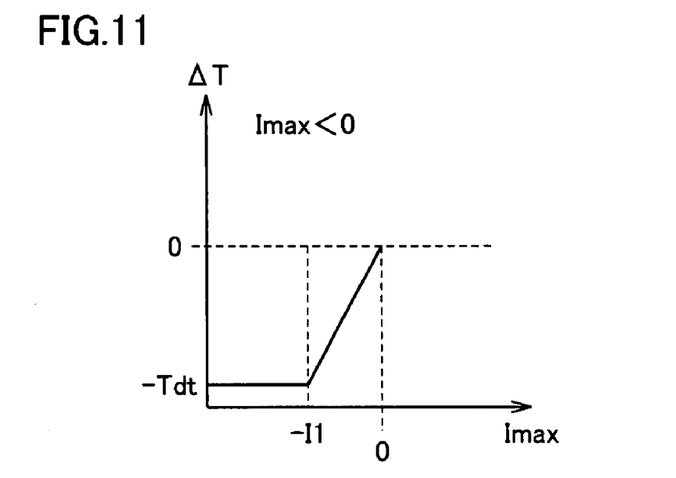
FIG. 11 shows a relationship between a dead time correction value and the reactor's current when the reactor's current is negative.

FIG. 11 shows a relationship between a dead time correction value and the reactor's current when the reactor's current is negative.

Figure 12:
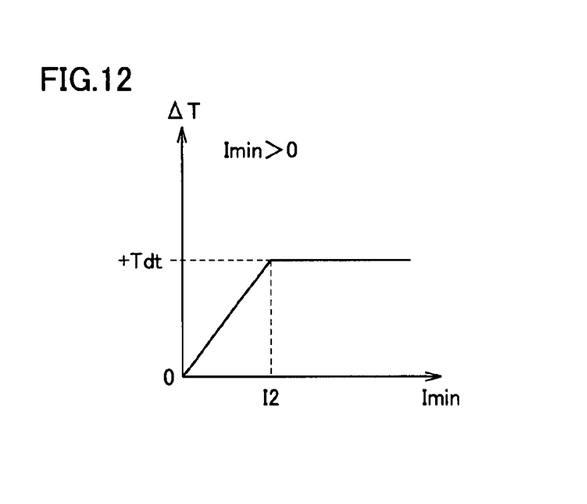
FIG. 12 shows a relationship between a dead time correction value and the reactor's current when the reactor's current is positive.

FIG. 12 shows a relationship between a dead time correction value and the reactor's current when the reactor's current is positive.

If the reactor's current for one cycle has maximum value Imax<0, then, as shown in FIG. 11, for a range of Imax<−I1, a dead time correction value ΔT is fixed at −Tdt, and for a range of −I1<Imax<0, dead time correction value ΔT is varied from −Tdt to 0 gradually.

In contrast, if the reactor's current for one cycle has minimum value Imin>0, then, as shown in FIG. 12, for a range of Imin>12, dead time correction value ΔT is fixed at +Tdt, and for a range of 0<Imin<12, dead time correction value ΔT is varied from 0 to +Tdt gradually.

In other words, in FIG. 2, DC/DC converter 30 includes reactor L, IGBT device TR3 operative in response to a first activation signal GUP to couple one end of reactor L with a first power supply node of the inverter, IGBT device TR4 operative in response to a second activation signal GUN to couple one end of reactor L with a ground node, dead time generation unit 37, and DC-CPU 31.

Dead time generation unit 37 operates in response to reference signal GATEBA for duty ratio, to output the first and second activation signals GUP and GUN having an inactive period corresponding to a dead time preventing both IGBT devices TR3 and TR4 from conducting. DC-CPU 31 corrects in accordance with the reactor's current value IL flowing through reactor L a tentative duty ratio calculated as based on voltage control value Vfcr, and outputs reference signal GATEBA. DC-CPU 31 associates the reactor's current value IL with three states, and when the reactor's current value approaches a value at which a state transitions to a different state, DC-CPU 31 gradually switches a correction value in accordance with the maps shown in FIGS. 11 and 12.

Reference signal GATEBA having a duty ratio thus corrected by a dead time correction value also allows smooth and steady voltage control when the reactor's current transitions to vary from a state to a different state.

SECOND EMBODIMENT

In the second embodiment DC-CPU 31 is replaced with a DC-CPU 31A.

Figure 13:
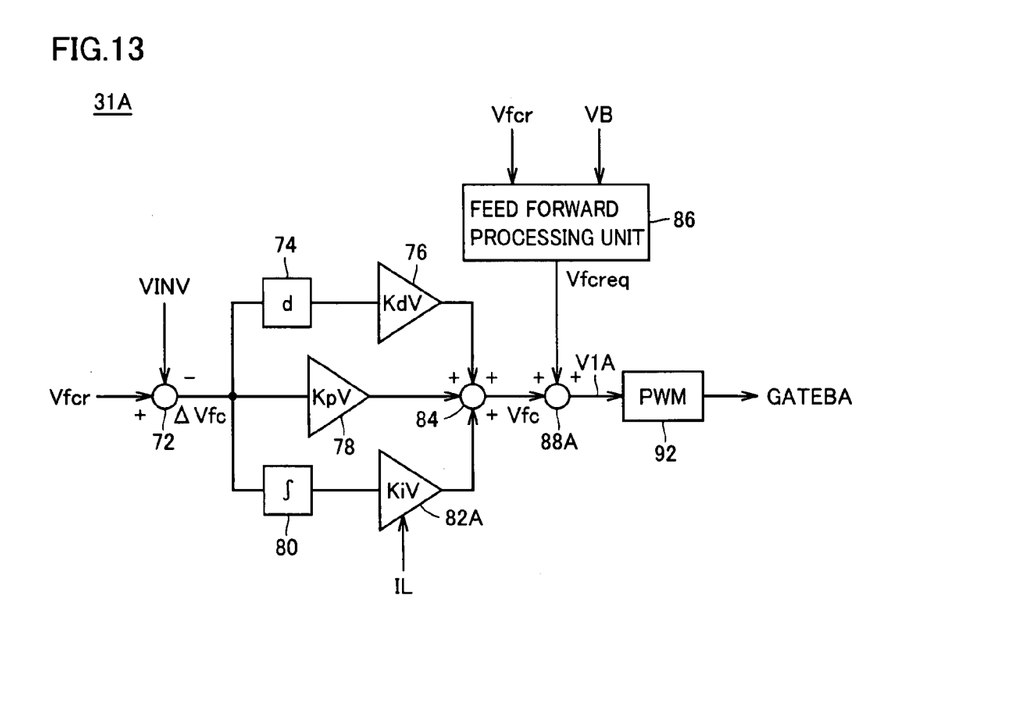
FIG. 13 is a block diagram showing a configuration of a DC-CPU 31A replacing DC-CPU 31 of FIG. 2 in a second embodiment.

FIG. 13 is a block diagram showing a configuration of DC-CPU 31A replacing DC-CPU 31 of FIG. 2 in the second embodiment.

With reference to FIG. 13, DC-CPU 31A includes operation unit 72 calculating deviation ΔVfc between voltage control value Vfcr and the inverter's voltage value VINV, processing unit 74 differentiating deviation ΔVfc, operation unit 76 multiplying an output of processing unit 74 by derivative term gain KdV, processing unit 80 integrating deviation ΔVfc, an operation unit 82A multiplying an output of processing unit 80 by integral term gain KiV, operation unit 78 multiplying deviation ΔVfc by mean proportional KpV, and operation unit 84 calculating a sum of outputs of operation units 76, 82 and 84. Operation unit 84 outputs sum signal Vfc. Operation unit 82A receives the reactor's current value IL from current sensor SE of FIG. 2, determines which one of states A-C of FIG. 5 it has, and increases/decreases the integral term gain to correspond to the determined state.

DC-CPU 31A further includes feed forward processing unit 86 receiving voltage control signal Vfcr and the battery's voltage value VB and calculating and outputting Vfcr/(VB+Vfcr) as voltage value Vfcreq, an addition processing unit 88A adding voltage value Vfc and voltage value Vfcreq together to output a voltage value V1A, and PWM processing unit 92 receiving voltage value V1A and outputting reference signal GATEBA.

PWM processing unit 92 outputs to buffer 32 and inversion buffer 36 of FIG. 2 signal GATEBA indicating a timing that serves as a reference for switching, that corresponds to voltage value V1 provided as a result of the addition provided by addition processing unit 88.

Figure 14:
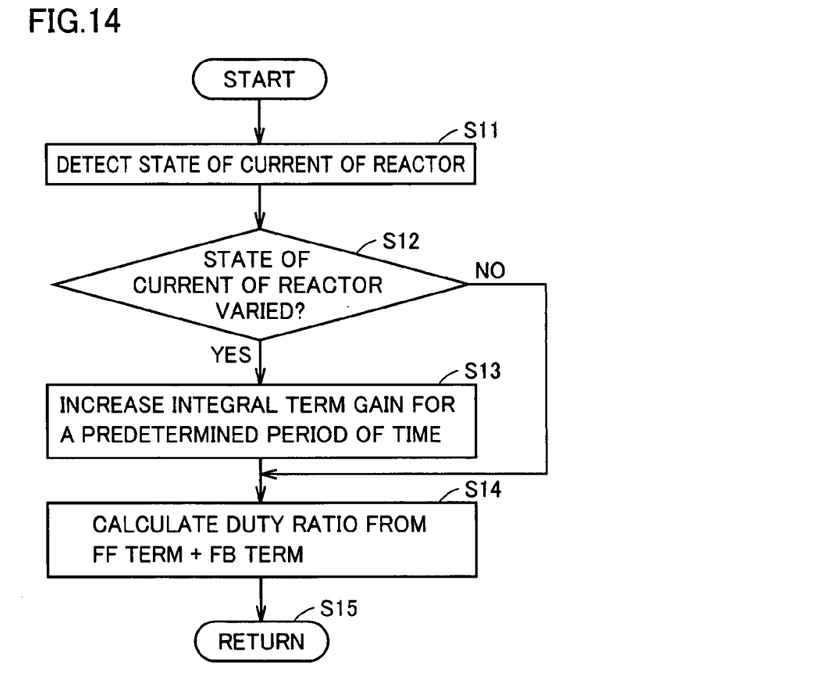
FIG. 14 is flowchart representing a structure of a process performed by DC-CPU 31A.

FIG. 14 is flowchart representing a structure of a process performed by DC-CPU 31A. This process is called for execution from a main routine of the control for each predetermined time or whenever a predetermined condition is established.

With reference to FIG. 14, when the process starts, initially at step S11 DC-CPU 31A obtains the reactor's current value IL output from current sensor SE of FIG. 2 and detects which one of states A-C of FIG. 5 the reactor's current currently has.

More specifically, while current value IL increases/decreases for one cycle, its peak value is observed. If Imax<0, a decision is made that the reactor's current has state A. If Imin>0, a decision is made that the reactor's current has state C. If Imin<0<Imax, a decision is made that the reactor's current has state B.

Then at step S12 a decision is made on whether the reactor's current IL has a state different from that obtained when it was immediately previously sampled. More specifically, whether, of states A-C of FIG. 5, a state transition of A→B, B→C or C→B, B→A has occurred, is detected.

If at step S12 the reactor's current has a varied state then the process proceeds to step S13 and the integral term gain is increased/decreased for a predetermined period of time, since when PID control is exerted, what is subjected to duty ratio correction by an amount corresponding to a dead time is the integral term gain, and accordingly, previously when a varied state of the reactor's current is detected the integral term gain is immediately matched to the varied state of the reactor's current.

Figure 15:
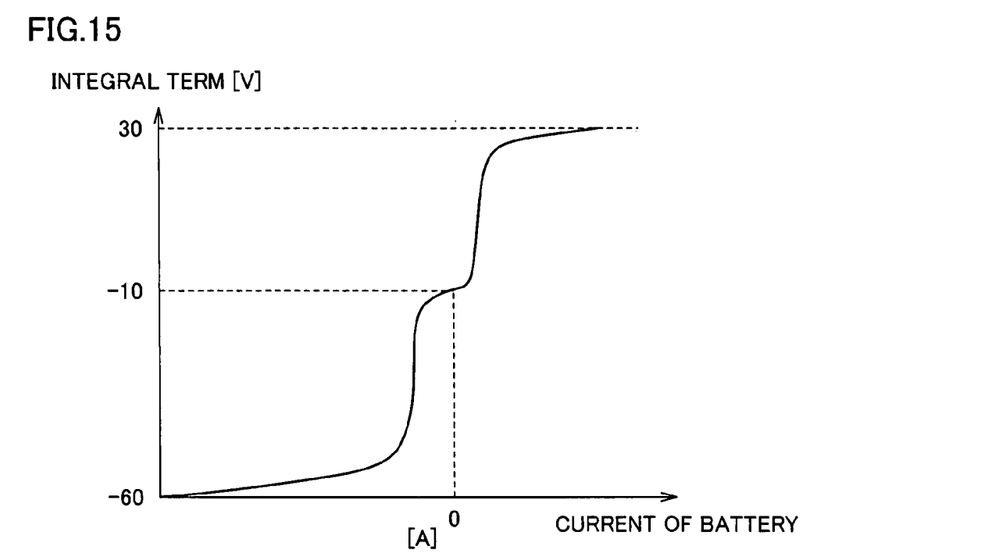
FIG. 15 shows an example of switching an integral term gain.

FIG. 15 shows an example of switching the integral term gain.

With reference to FIG. 15, the horizontal axis represents the battery's current corresponding to the state of the reactor's current. The vertical axis represents the integral term gain corrected. When the battery's current is negative, i.e., when the battery is charged, the integral term gain is −60V. When the battery's current is positive, i.e., when the battery is discharged, the integral term gain is +30V. When the battery's current is around 0, the integral term gain is −10V.

Note that as seen in FIG. 5, when the battery's current is positive, the reactor's current has a state corresponding to state C, and that as seen in FIG. 5, when the battery's current is negative, the reactor's current has a state corresponding to state A, and when the battery's current is around 0, the reactor's current has a state corresponding to state B. As such, even if reactor L is not provided with current sensor SE, observing the battery's current IB enables general control of the duty ratio correction.

With reference again to FIG. 14, when step S13 ends, the process proceeds to step S14. The process also proceeds to step S14 if at step S12 no varied state of the reactor's current is detected.

At step S14 initially a feed forward term (a FF term) and a feed back term (an FB term) are calculated. The FF term is obtained by calculating Vfcr/(VB+Vfcr). The FB term is obtained by performing a PID process to deviation ΔVfc between voltage control value Vfcr and the inverter's voltage value VINV. The PID process has an integral term gain increased/decreased as required. Then the FF term+the FB term is calculated to obtain voltage value V1A of FIG. 13 and reference signal GATEBA of a duty ratio corresponding to voltage value V1A is obtained.

When step S14 completes, the process proceeds to step S15 and the control returns to the main routine. Such process allows an output voltage to converge to a target value at an early stage if the reactor's current has a varied state.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:

1. A voltage conversion device comprising:
a reactor;
a first switching device operative in response to a first activation signal to couple one end of said reactor with a first power supply node;
a second switching device operative in response to a second activation signal to couple said one end of said reactor with a ground node;
a first dead time generation unit operative in response to a reference signal for a duty ratio, to output said first and second activation signals provided with an inactive period corresponding to a dead time preventing both said first and second switching devices from conducting; and
a control unit correcting a tentative duty ratio calculated as based on a voltage control value, in accordance with a value of a current flowing through said reactor, to output said reference signal, wherein said control unit exerts proportional-plus-integral-plus-derivative control based on a deviation between said voltage control value and an output voltage value and corrects an integral term in accordance with said value of said current of said reactor to correct said tentative duty ratio.

2. The voltage conversion device according to claim 1, further comprising:
a second dead time generation unit operative in response to said reference signal to output a third activation signal and a fourth activation signal activated in synchronization with said second activation signal and said first activation signal, respectively; and a third switching device operative in response to said third activation signal to couple an other end of said reactor with a second power supply node;
a fourth switching device operative in response to said fourth activation signal to couple said other end of said reactor with a ground node.

3. The voltage conversion device according to claim 2, wherein said first power supply node is connected to an inverter for driving a motor and said second power supply node is connected to an electric storage device.

4. The voltage conversion device according to claim 3, wherein a fuel cell is also connected to said first power supply node via a rectification element.

5. A vehicle comprising a voltage conversion device including:
a reactor;
a first switching device operative in response to a first activation signal to couple one end of said reactor with a first power supply node;
a second switching device operative in response to a second activation signal to couple said one end of said reactor with a ground node;
a first dead time generation unit operative in response to a reference signal for a duty ratio, to output said first and second activation signals provided with an inactive period corresponding to a dead time preventing both said first and second switching devices from conducting; and
a control unit correcting a tentative duty ratio calculated as based on a voltage control value, in accordance with a value of a current flowing through said reactor, to output said reference signal, wherein said control unit exerts proportional-plus-integral-plus-derivative control based on a deviation between said voltage control value and an output voltage value and corrects an integral term in accordance with said value of said current of said reactor to correct said tentative duty ratio.

6. The vehicle according to claim 5, wherein said voltage conversion device further includes:
a second dead time generation unit operative in response to said reference signal to output a third activation signal and a fourth activation signal activated in synchronization with said second activation signal and said first activation signal, respectively; and
a third switching device operative in response to said third activation signal to couple an other end of said reactor with a second power supply node;
a fourth switching device operative in response to said fourth activation signal to couple said other end of said reactor with a ground node.

7. The vehicle according to claim 6, further comprising:
a motor driving a wheel;
an inverter connected to said first power supply node and driving said motor; and
a storage device connected to said second power supply node.

8. The vehicle according to claim 7, further comprising:
a fuel cell; and
a rectification element connected between said first power supply node and said fuel cell.

* * * * *

UNITED STATES PATENT AND TRADEMARK OFFICE
CERTIFICATE OF CORRECTION

Page 1 of 1

PATENT NO. : 7,715,217 B2
APPLICATION NO. : 11/886791
DATED : May 11, 2010
INVENTOR(S) : Kota Manabe et al.

It is certified that error appears in the above-identified patent and that said Letters Patent is hereby corrected as shown below:

On the Title Page:

Change "(30)    Foreign Application Priority Data

Mar. 31, 2007 (JP)............ 2005-102752" to

--(30)    Foreign Application Priority Data

Mar. 31, 2005 (JP)............ 2005-102752--.

| Column | Line | |
|---|---|---|
| 11 | 30 | Change "Imin>I2" to --Imin>I2--. |
| 11 | 31 | Change "0<Imin<I2" to --0<Imin<I2--. |

Signed and Sealed this

Eleventh Day of January, 2011

David J. Kappos
*Director of the United States Patent and Trademark Office*